United States Patent
Le Bescond de Coatpont

(10) Patent No.: US 10,318,628 B2
(45) Date of Patent: *Jun. 11, 2019

(54) SYSTEM AND METHOD FOR CREATION OF TEMPLATES

(71) Applicant: OPEN TEXT SA ULC, Halifax (CA)

(72) Inventor: Bertrand Guy Le Bescond de Coatpont, Mulhouse (FR)

(73) Assignee: Open Text SA ULC, Halifax (CA)

( * ) Notice: Subject to any disclaimer, the term of this patent is extended or adjusted under 35 U.S.C. 154(b) by 85 days.

This patent is subject to a terminal disclaimer.

(21) Appl. No.: 15/484,860

(22) Filed: Apr. 11, 2017

(65) Prior Publication Data
US 2017/0220548 A1     Aug. 3, 2017

Related U.S. Application Data

(63) Continuation of application No. 14/073,516, filed on Nov. 6, 2013, now Pat. No. 9,652,441.

(60) Provisional application No. 61/722,855, filed on Nov. 6, 2012.

(51) Int. Cl.
*G06F 17/22* (2006.01)
*G06F 17/24* (2006.01)
*G06F 16/958* (2019.01)

(52) U.S. Cl.
CPC .......... *G06F 17/248* (2013.01); *G06F 16/958* (2019.01); *G06F 16/986* (2019.01); *G06F 17/2247* (2013.01)

(58) Field of Classification Search
CPC ........................ G06F 17/248; G06F 17/2247; G06F 17/218
See application file for complete search history.

(56) References Cited

U.S. PATENT DOCUMENTS

| | | |
|---|---|---|
| 6,605,120 B1 | 8/2003 | Fields et al. |
| 7,073,122 B1 | 7/2006 | Sedghi |
| 7,441,187 B2 | 10/2008 | Meadows |
| 7,593,960 B2 | 9/2009 | Kahn et al. |
| 7,703,004 B2 * | 4/2010 | Bier .................... G06F 17/2247 715/234 |
| 8,046,681 B2 | 10/2011 | Vydiswaran et al. |

(Continued)

OTHER PUBLICATIONS

Office Action issued for European Patent Application No. 13191618.1, dated Mar. 2, 2018, 6 pages.

(Continued)

*Primary Examiner* — Maikhanh Nguyen

(74) *Attorney, Agent, or Firm* — Sprinkle IP Law Group

(57) ABSTRACT

Embodiments described herein allow for the creation of templates from existing web pages, making it possible to create pages. Embodiments can provide visual tools so that a user can convert an existing web site or web page into a template. The template may be made available to a web content management application for the creation of web pages. According to one embodiment, a template developer can visually identify selectable portions of the web page in a rendering of the web page; receive a first component selection of a first selected portion of the web page; and store template data comprising the first component selection. A template builder can create a template and components based on the template data in a format consumable by a web content management system.

17 Claims, 14 Drawing Sheets

(56) References Cited

U.S. PATENT DOCUMENTS

| | | | |
|---|---|---|---|
| 8,312,425 B2* | 11/2012 | Hepper | G06F 17/3089 717/104 |
| 8,321,846 B2 | 11/2012 | Chatterjee | |
| 8,438,312 B2 | 5/2013 | Kapur et al. | |
| 8,875,032 B2 | 10/2014 | Olsen et al. | |
| 9,021,348 B1 | 4/2015 | Meschkat et al. | |
| 9,092,414 B2 | 7/2015 | Levy et al. | |
| 9,262,185 B2 | 2/2016 | Hill et al. | |
| 9,426,201 B2 | 8/2016 | Burckart et al. | |
| 9,652,441 B2 | 5/2017 | Le Bescond de Coatpont | |
| 2005/0275662 A1 | 12/2005 | DiStefano, III | |
| 2006/0143182 A1 | 6/2006 | Meadows | |
| 2006/0149751 A1 | 7/2006 | Jade et al. | |
| 2007/0206221 A1 | 9/2007 | Wyler et al. | |
| 2008/0071929 A1 | 3/2008 | Motte et al. | |
| 2008/0148157 A1 | 6/2008 | Kamdar et al. | |
| 2008/0168345 A1* | 7/2008 | Becker | G06F 17/30896 715/242 |
| 2009/0019386 A1* | 1/2009 | Sweetland | G06F 17/248 715/765 |
| 2009/0282349 A1 | 11/2009 | Olsen et al. | |
| 2010/0199197 A1 | 8/2010 | Faletski et al. | |
| 2013/0212062 A1 | 8/2013 | Levy et al. | |
| 2013/0298010 A1 | 11/2013 | Rogers et al. | |
| 2014/0129924 A1 | 5/2014 | Le Bescond de Coatpont | |

OTHER PUBLICATIONS

European Search Report for European Patent Application No. 13191618.1, dated Dec. 10, 2013, 6 pages.
Office Action issued for U.S. Appl. No. 14/073,516, dated Feb. 10, 2016, 12 pages.
Office Action issued for U.S. Appl. No. 14/073,516, dated Aug. 10, 2016, 16 pages.
Notice of Allowance issued for U.S. Appl. No. 14/073,516, dated Jan. 12, 2017, 23 pages.
Jiang et al. "TEB: A Template-based E-Commence Website Builder for SMEs", 2008 IEEE, pp. 23-28.
Su-Bin et al. "A Direct Web Page Templates Detection Method", 2011 IEEE, 4 pages.
Yin et al. "A Template-based Method for Theme Information Extraction from Web Pages", 2010 IEEE, pp. 721-725.

* cited by examiner

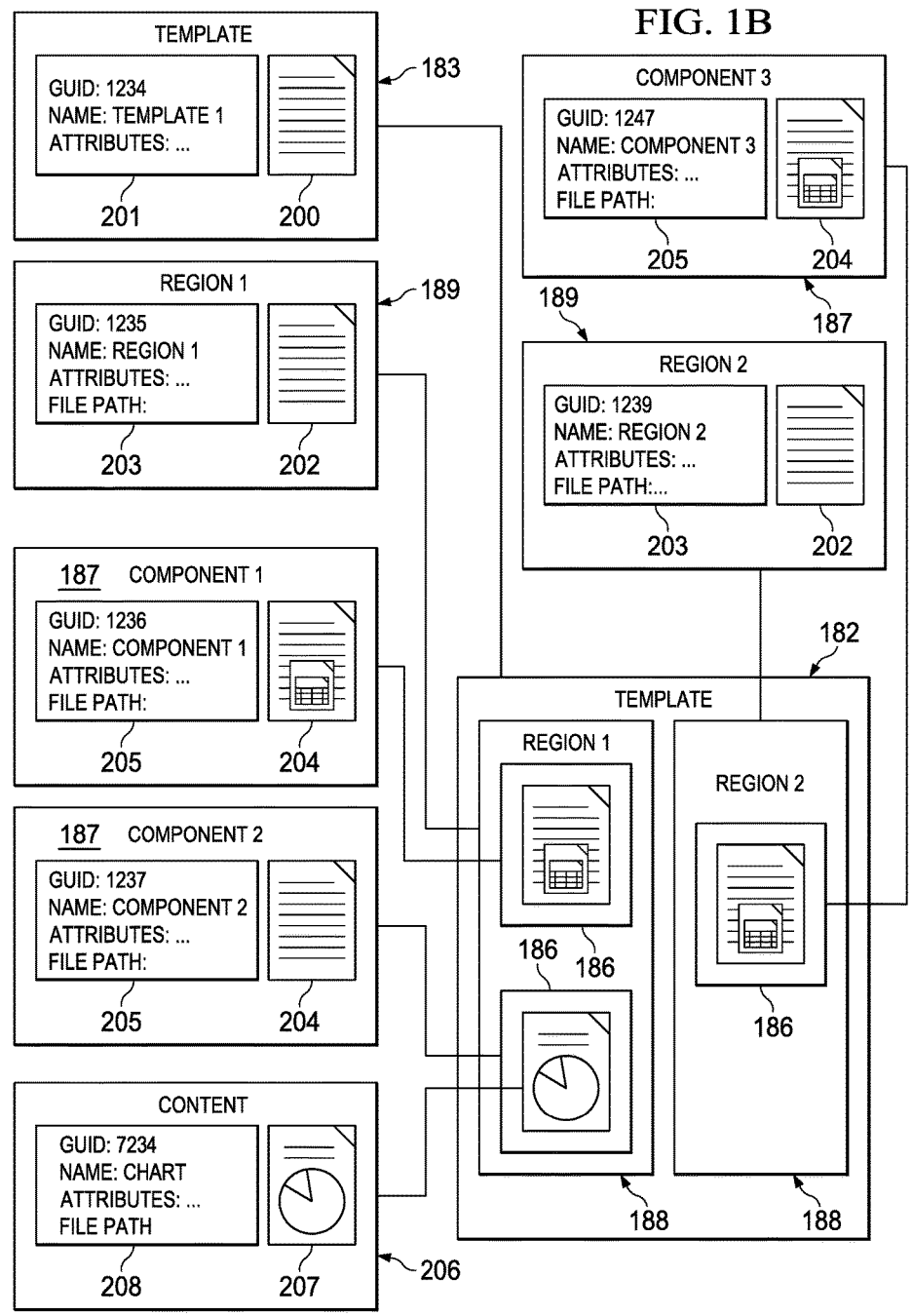

ns and methods for creation of templates

SYSTEM AND METHOD FOR CREATION OF TEMPLATES

CROSS-REFERENCE TO RELATED APPLICATIONS

This application is a continuation of, and claims a benefit of priority under 35 U.S.C. 120 of the filing date of U.S. patent application Ser. No. 14/073,516, issued as U.S. Pat. No. 9,652,441, filed Nov. 6, 2013, entitled "SYSTEM AND METHOD FOR CREATION OF TEMPLATES," which is a conversion of, and claims a benefit of priority from U.S. Provisional Application No. 61/722,855, filed Nov. 6, 2012. Both of which are hereby fully incorporated by reference herein for all purposes.

TECHNICAL FIELD

This disclosure relates generally to web content management. More particularly, this disclosure relates to a system, method, and computer program product for rapid creation of templates.

BACKGROUND OF RELATED ART

Building a web site manageable by a web content management (WCM) application generally requires a deep understanding of the WCM tool and programming interfaces. Hence the ability to build a Web site using a WCM application may be available only to people with technical skills and extended training and experience with the tool.

More specifically, constructing a Web site so that it can be managed via a WCM application requires some HTML mock-ups or HTML pages to be "decomposed" into building blocks as required by the WCM application. This process usually requires many manual assembling steps. For example, each of the decomposed elements may be registered manually in the WCM application so that they can be used to manually build templates. Such a web site construction method can be time consuming depending on the complexity of the web site. Furthermore, only people with a deep knowledge of the WCM application can create templates.

SUMMARY

Embodiments described herein provide systems and methods that allow for building of templates from existing web pages. One embodiment of a template building system can comprise a template developer. The template developer can be configured to visually identify selectable portions of a web page in a rendering of the web page, receive a first component selection of a first selected portion of the web page and store template data comprising the first component selection, attributes or other information.

According to one embodiment, the template developer can parse the web page source code to identify elements of the web page source code and visually identify portions of the web page corresponding to the identified elements as the selectable portions of the web page. Elements include, but are not limited to, <div> elements and <table> elements.

The system may also comprise a template builder that is configured to receive the template data and generate a template and components. According to one embodiment, the template builder can generate a first component for the first component selection, the first component comprising a first portion of the web page source code that corresponds to the first selected portion of the web page. The template builder can further generate a template comprising a second portion of the web page source code.

The template developer may also receive a first region selection of a second selected portion of the web page where the second selected portion of the web page contains the first selected portion of the web page. The template developer can store the first region selection as part of the template data. The template builder can generate a first region comprising a third portion of the web page source code, the third portion of the web page source code corresponding to the second selected portion of the web page.

In some embodiments, a client computer may comprise the template developer and a web browser and a server computer coupled to the client computer over a network may comprise in the template builder. In another embodiment, the same computer may comprise the template developer and the template builder.

One embodiment of a method for creating templates can include the steps of parsing web page source code of a web page to identify elements of the page source code; visually indicating selectable portions of the web page in a rendering of the web page; receiving a first component selection of a first selected portion of the web page; storing template data comprising the first component selection and component attributes associated with the first component selection; and providing template data comprising the first component selection and component attributes associated with the first component selection to a template builder. The method may further include processing the template data to generate a first component comprising a first portion of the web page source code, the first portion of the web page source code corresponding to the first selected portion of the web page, and generate a template comprising a second portion of the web page source code.

The method may further include the steps of receiving, a first region selection of a second selected portion of the web page, the second selected portion of the web page containing the first selected portion of the web page; storing the first region selection as part of the template data; and processing the template data to generate a first region comprising a third portion of the web page source code, the third portion of the web page source code corresponding to the second selected portion of the web page.

Another embodiment can include a computer program product comprising a non-transitory computer readable medium storing a set of computer instructions. The computer instructions can comprise instructions executable to: parse web page source code of a web page to identify elements of the page source code; visually indicate selectable portions of the web page in a rendering of the web page; receive a first component selection of a first selected portion of the web page; store template data comprising the first component selection and component attributes associated with the first component selection; and provide the template data comprising the first component selection and component attributes associated with the first component selection to a template builder.

The computer instructions may further include instructions executable to generate a first component comprising a first portion of the web page source code, the first portion of the web page source code corresponding to the first selected portion of the web page and generate a template comprising a second portion of the web page source code.

The computer instructions may further include instructions executable to receive, a first region selection of a second selected portion of the web page, the second selected portion of the web page containing the first selected portion of the web page; store the first region selection as part of the template data; and process the template data to generate a first region comprising a third portion of the web page source code, the third portion of the web page source code corresponding to the second selected portion of the web page.

Embodiments described herein allow for the creation of templates from existing web pages. Embodiments provide an advantage by making the template creation process relatively easy, in some cases making it possible to create a web site in a few seconds or minutes, what could otherwise take days or weeks.

Embodiments also enable template creation by users who may not otherwise have the requisite technical knowledge to create templates. Some embodiments can provide visual "point and click" tools so that any user to convert an existing web site or web page into a template.

Embodiments can also provide an advantage by automatically registering the template and components with a web content management application for the creation of web pages.

BRIEF DESCRIPTION OF THE DRAWINGS

A more complete understanding of the invention and the advantages thereof may be acquired by referring to the following description, taken in conjunction with the accompanying drawings in which like reference numbers indicate like features and wherein:

FIG. 1B is a diagrammatic representation of one embodiment of a set of objects for storing and managing templates, components and regions;

DETAILED DESCRIPTION

Figure 1A:
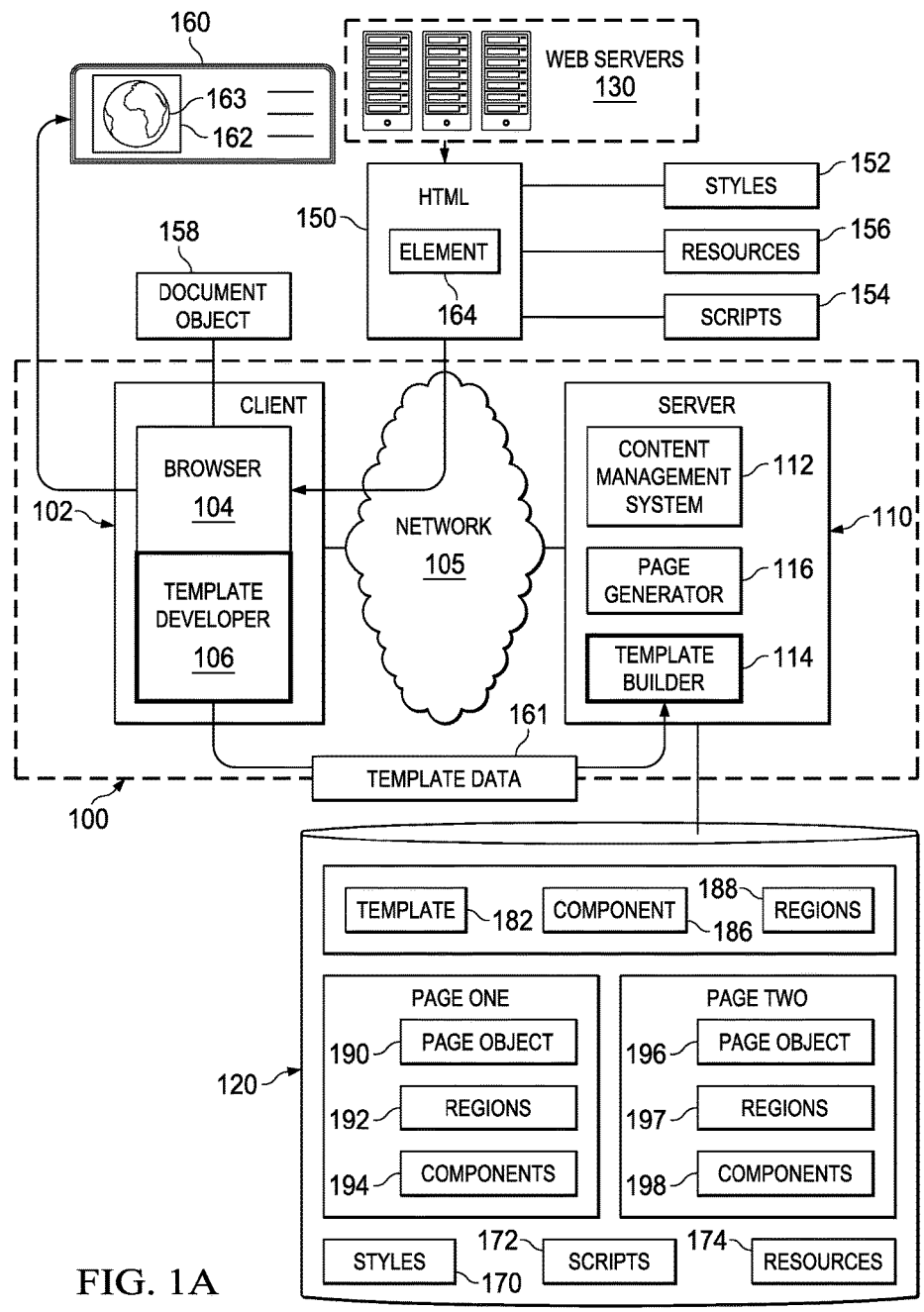
FIG. 1A is a diagrammatic representation of one embodiment of a network that comprises a template building system.

Systems and methods for the creation of templates and the various features and advantageous details thereof are explained more fully with reference to the nonlimiting embodiments that are illustrated in the accompanying drawings and detailed in the following description. Descriptions of well-known processing techniques, components and equipment are omitted so as not to unnecessarily obscure the invention in detail. It should be understood, however, that the detailed description and the specific examples, while indicating preferred embodiments of the systems and methods, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present); A is false (or not present) and B is true (or present); both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Some embodiments may be implemented in a computer communicatively coupled to a network (for example, the Internet, an intranet, an internet, a WAN, a LAN, a SAN, etc.), another computer, or in a standalone computer. As is known to those skilled in the art, the computer can include a central processing unit ("CPU") or processor, at least one read-only memory ("ROM"), at least one random access memory ("RAM"), at a mass storage device (e.g., a hard drive ("HD")), and one or more input/output ("I/O") device(s). The I/O devices can include a keyboard, monitor, printer, electronic pointing device (for example, mouse, trackball, stylist, etc.), or the like. In certain embodiments, the computer has access to at least one database locally or over the network.

Within this disclosure, the term "computer readable medium" is not limited to ROM, RAM, and HD and can include any type of non-transitory data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented by programmed logic executing suitable computer-executable instructions that may reside on a computer readable medium (for example, a disk, CD-ROM, a memory, etc.). Computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of embodiments may be implemented on one computer or shared or distributed among two or more computers across a network. In one embodiment, the functions of embodiments may be distributed in the network. Communications between computers implementing embodiments of the invention can be accomplished using any electronic, optical, radio frequency signals, or other suitable methods and tools of communication in compliance with network protocols.

It will be understood for purposes of this disclosure that a service or module is one or more computer devices, configured (e.g., by a computer process or hardware) to perform one or more functions. A service may present one or more interfaces which can be utilized to access these functions. Such interfaces include APIs, interfaces presented for a web services, web pages, remote procedure calls, remote method invocation, etc.

Web site systems sometimes rely on web page templates to generate web pages. In general, a web page template system can include a number of templates that specify common structure, layout, style and other aspects of web pages generated from the template. Templates can be stored in a variety of formats including as JSP files, static files, ASP files and others. In some cases, a template may include variables, functions, references to sub-templates, content, external files and other features. In order to create specific web pages from a template, a page generator can process the template files to generate page source code (e.g., HTML, other page source). Depending on the variables, scripts, functions and other aspects of the template and the sub-templates or changes to the content items referenced by the template and the sub-templates, the web page source code generated from the template in response to different requests may be different. Thus, the same template can be used to generate multiple web pages.

The use of templates can allow specific content to be separated from common presentation and logic. Furthermore, the template may separate styles from content by referencing external resources (e.g., CSS style sheets and the like) that define the style of a web page.

Embodiments described herein allow for the creation of templates from existing web pages, making it possible to create a web site in a few seconds or minutes what could otherwise take days or weeks. Embodiments can provide visual "point and click" tools so that any user to convert an existing web site or web page into a template. The template may be made available to a web content management application for the creation of web pages.

FIG. 1A is a diagrammatic representation of one embodiment of a template building architecture that comprises a template building system 100 that builds templates from web pages provided by web site servers 130.

Template building system 100 may be bi-directionally coupled to web site servers 130 via network 105 (one or more WANs, LANS, the Internet, Intranets or other networks). Template building system 100 includes client computer 102 (on or more client computing devices) connected by a network 105 to server 110 (one or more server machines). In some cases, client computer 102 is connected to server 110 and web servers 130 via the same network and in other embodiments by different networks. Client computer 102 comprises a web browser 104 and a template developer 106. Server 110 can provide a web content management system 112, template builder 114 and page generator 116.

In operation, web browser 104 may request a web page from one or more web site servers 130. In response, a web site server 130 can return web page source code 150 (e.g., HTML or other source code). Source code 150 may reference external elements including styles 152 (e.g., CSS style sheets), scripts 154 and other resources 156 (images, media, etc.) that browser 104 may also fetch. Browser 104 can process source code 150 and external resources to create a document object 158 having nodes according to a Document Object Model (DOM) and render web page 160 in a display. Web page 160 is rendered by browser 104 according to the styles, content, layout and structure as defined by elements in or referenced by source code 150.

A user may find it desirable to use web page 160 as a model for generating new web pages having similar characteristics. Such new web pages may, in turn, be used to create web content based in part on the format, style, layout and/or content of web page 160. Accordingly, a user can initiate a template building process to build a template from web page 160. In one embodiment, browser 104 may send a request to template builder 114 and template builder 114 may retrieve source code 150. Template builder 114 can send a copy of source code 150 to browser 104 such that template developer 106 is processing a copy of source code 150 from server 110 during the template creation process. In other embodiments, browser 104 may use a copy of source code 150 received from the host web server 130.

Template developer 106 can allow the user to determine which aspects of web page 160 should be included as part of a template (or sub-template) and which portions should be managed as separate elements referenced by the template (or sub-template). To this end, template developer 106 can parse source code 150 for elements of source code 150 and visually identify portions of rendered page 160 that correspond to the elements as selectable portions of the web page. Parsing source code 150 may comprise analyzing source code 150 directly, parsing the document object 158 or otherwise analyzing information to identify elements, resources or other aspects of the source code.

The user may select which elements are part of the template or sub-template and which elements are separate components (elements that are managed separately from the template or sub-template). According to one embodiment, elements not selected as a separate page component (or sub-template) can be incorporated in a template. Templates, components and other items may be stored according to a format for storing templates and components used by the web content management system 112.

According to one embodiment, template developer 106 may parse source code 150 for elements (<div>, <table>, <iframe>, <span> or other elements) that correspond to logical portions of the web page and visually identify the portions in the rendered web page 160. For example, template developer 106 can parse source code 150 for <div> elements and visually indicate the portions of web page 160 that correspond to the <div> elements as selectable portions. As an example, if portion 162 (containing graphic 163) corresponds to <div> element 164, template developer 106 may visually identify portion 162 as a selectable portion.

The user may interact with browser 104 to select identified portions of web page 160 (e.g., to select portion 162 or other portion) as a component. Template developer 106 can receive the component selection that indicates the selected portion of web page 160 (e.g., a component selection selecting portion 162 containing image 163). The template developer 106 can store the selections by tagging page source code 150, tagging document object 158 or otherwise storing an indication of which portions of web page 160 were selected as components or other items.

Template developer 106 can also parse source code 150 to identify styles 152, scripts 154 and other resources 156 referenced in source code 150. The user may be presented with options to import these resources for management by web content management system 112. In some embodiments, template developer 106 may also identify internal script, style and other elements that can be separated from the template or components built from page 160.

Based on user selections, template developer 106 can provide a set of data (referred to as template data 161) to template builder 114. A copy of source code 150 may also be sent to template builder 114. Template builder 114 can retrieve the resources from their sources and store these items as managed items in data store 120 (e.g., as styles 170, scripts 172 and resources 174). In some cases, multiple styles may be grouped together as a "theme" so that the styles may be managed as a single object that can be applied to multiple templates.

Template builder 114 can process template data 161 to generate templates 182 and associated items in a form that is manageable by web content management system 112 and stored in memory accessible by server 110 (e.g., in data store 120). Template builder 114 may also register the template 182 and related items with web content management system 112.

Source code for different portions of the web page selected by the user may be incorporated into independently managed objects of content management system 112 with appropriate references inserted in the source code. Template builder 114 can create a template 182 that incorporates source code 150 of page 160. For an element that was selected as a component, template builder 114 can create a component 186 that incorporates the source code 150 for that element. The source code incorporated in the template may be modified to reference the component rather than including the source code for the component. For nested elements selected by the user as separate objects, the source code for and outer component can include a reference to the inner component and so on (e.g., a component corresponding to an outer <div> element may include a reference to an object containing the inner HTML of the <div> element).

In some embodiments, source code may be changed by adding instructions, descriptors or other code inside the source code. If styles, scripts or other resources have been imported, links to the resources can be changed to ensure source code correctly points to resources in data store 120 and not to the original hosted site. For example, source code may be changed to reference styles 170, scripts 172 and resources 174 rather than the source styles 152, scripts 154 and resources 156. Thus, if the file for image 163 is imported into data store 120, links referencing the source of image 163 may be changed to reference the image file in data store 120. In some cases, the reference may be to another object that further references the resources (e.g., a link to styles 152 may be changed to reference a theme object that further references styles 170).

As discussed above, templates, components and other items may be stored according to a format utilized by web content management system 112. In one embodiment, web content management system 112 may utilize a format in which a page is decomposed into a template 182, components 186 and regions 188. The template 182 can provide the overall structure for a web page, a region 188 can specify an area of the template that is suitable to receive content components and a component 186 defines which content to display.

Template 182, regions 188 and components 186 can be managed as content objects. Each content object can have an arbitrary amount of metadata associated with it such as a name, unique id or other metadata. For purposes of website management, such metadata may also include whether the content object has been approved for publication, whether it was published, or any other information that is useful in classifying the content object for website management.

To identify a portion of web page 160 that may be selected as a region or component, template developer 106 can parse page source code 150 for structural elements. According to one embodiment, template developer 106 can parse source code 150 for <div> elements (or other elements such as <table>, <iFrame>, <span>, etc.) and highlight the corresponding portions in rendered web page 160. In one embodiment, the nearest <div> element can be identified (it could be a nested <div> with more than one <div> or a single <div>) based on positioning of a cursor or pointer on page 160 and the portion of rendered web page 160 corresponding to that <div> element highlighted. The user can select the identified portion of the web page and specify whether the element should be classified as a region or component. This process may be repeated for any number of elements. In this manner, the user can select the <div> elements (or other elements) that are to be managed as components 186 or regions 188.

In some cases, identifying and classifying elements may take into account rules applied by server computer 110. For example, if a region can contain components but not regions, then a selected nested element may be automatically classified as a component. Similarly, if an element within a component is selected, that nested element can be automatically classified as a component and the outer element reclassified as a region. If the selections and classifications made by the user violate rules, template developer 106 may present a warning to the user or prevent the user from making specific selections/classifications.

When a portion of web page 160 is classified as a component or region, template developer 106 can associate the corresponding portion of source code 150 with the component or region. One or more attributes may be associated with the portion of source code 150 to describe the portion as a component or region. The attributes can define a name (e.g., "Component 1"), a type of component (e.g., "text", "image"), a unique ID, or other information. Thus, for example, if the user selects portion 162 as a component, template developer 106 may associate element 164 with a component name, component type and other attributes.

To associate portions of source code 150 with a template, component or regions, template developer 106 can tag source code 150 so that portions of source code 150 can be identified as a template, region or component. According to one embodiment, template developer 106 can tag nodes in document object 158 to track user selections, classifications of elements and attributes. For example, a node for element 164 in document object 158 may be tagged as a component and a component name and other attributes inserted. In another embodiment, template developer 106 can maintain a copy of source code 150 and modify the copy of source code 150. Modification may include changing the source code, or may include adding or attaching language to the source code to tag portions of the source code.

Once the user has selected all the components and regions to be used in the template, the user can request creation of a template based on the selected component(s) or region(s). The modified source code for the page, the tagged document object or other information can be sent to server 110 as part of template data 161. Additionally, the unmodified source code 150 may be sent in some embodiments. Data sent to server 110 may include the attributes or other information that enable server computer 110 to transform the HTML or other source code into a template with manageable components and regions. The data may identify areas as regions or components, or define portions or areas that are to be used for text, navigation, etc.

According to one embodiment, template builder 114 decomposes the source for each component, region, and template and creates a .jsp (executable JSP template file(s)) other file(s) or data structure(s) for each in data store 120. The HTML (or other source code) of template 182 can be modified so that the <div> tags (or other tags) corresponding to regions and components are updated with metadata that references the region 188 or component 186 to insert. Similarly, the HTML (or other source code) of a region 188 is modified with metadata that references any components 186 to insert. The HTML (or other source code) of template 182, regions 188 and components 186 can also be modified to change references to reference styles 170, scripts 172 and resources 174.

For example, if a <div> element is identified as "Region 1", the HTML between the <div> and </div> tag for the element can be replaced with a tag from a tag library, such as page: region name="Region 1") to indicate that the area is a managed region. A JSP file associated with a Region 1 object can be created to contain the HTML from the element. Similarly, if a <div> element identified as a "Component 1" (in a region or template), the HTML between the <div> and </div> tag can be replaced with a tag page: component name="Component 1" to indicate that the area is a managed component. A JSP file associated with the name "Component 1" can be created to contain the HTML of the element. A similar process can be used if other elements are used to define regions and components.

In some cases, the format used by the web content management system 112 may require the creation of additional components or other items not specified by the user. For example, in one embodiment, the format may require that a component be part of a region. If the user does select any portion of web page 160 to be a region, template builder 114 can automatically create a region object and source code for a region to contain the component. The template source can be modified to refer to the region. For example, if the user identifies element 164 as Component 1 (e.g., with a page: region name="Region 1" tag), but does not define a region containing Component 1, template builder 114 may create a Region 1 object with the source code tagged with page: component name="Component 1". The template source code between the <div> tags corresponding to element 164 can be tagged with page: region name="Region 1" to indicate that the area is a managed region.

The .jsp files (or other data structures) may be saved in a folder for storing the template object and content objects. According to one embodiment, the folder may include objects for template 182, regions 188, components 186 and other content objects. The folder may further store a theme object including imported styles 170 or information about the theme of the web page, such that the look and feel of the web pages generated from the template can be modified as needed. The folder may further include scripts 172 or other resources. In other embodiments, the template and resource may be otherwise stored.

Template builder 114 can send a notification to the user when the template building process is complete. In one embodiment, the user can push a "view template" button and then be transferred to a content management environment provided by web content management system 112 in which the user can view the web page recreated from the templates. To create page source code from a template, page generator 116 can execute files of template 182, regions 188 and components 186 to generate and assemble the page source code.

In some embodiments, the template may be used to quickly create web pages. As discussed above, the user may cause a web page to be generated from template 182. The user may "save" the web page as a new web page. In this case, the appropriate .jsp files and other content objects can be stored in a location for the page in data store 120. For example, a user may cause a page to be generated from template 182 and then store the page as "page 1". Web content management system 112 can store content objects in a location for "page 1" (e.g., in a "page 1" directory location or elsewhere) with relative references changed. According to one embodiment, a page object 190 can be stored referencing template 182. Regions 192 and components 194 can also be stored for "page 1".

In some cases, the user can edit a region or component and store the edited version of the web page as a new web page. For example, a user can modify "Component 1" of components 186 and store the page as "page 2". A page object 196 can be stored referencing template 182. Regions 197 and modified components 198 can also be stored for "page 2." In this example, the Component 1 object in components 194 may be different than the Component 1 object in modified components 198 (e.g., the .jsp files or other data structures can be different).

For requests for page "page 1", page generator 116 can resolve the request to the content objects associated with "page 1" whereas, for requests for page "page 2", page generator 116 can resolve the requests to the content objects associated with "page 2". The "page 1" and "page 2" pages rendered to the user would include different content (corresponding to the changes to Component 1) without requiring modification of the template. However, because "page 1" and "page 2" are associated with template 182, changes to template 182 can be automatically propagated to "page 1" and "page 2".

According to one embodiment, page generator 116 can generate page source to include in-context editing tools to allow for editing of templates and the creation of new web pages. One embodiment of systems and methods for providing in-context editing is described in U.S. patent application Ser. No. 11/257,588, entitled "System, Method and Computer Program Product for Editing Web Pages In-Context of a Production View," which is hereby fully incorporated by reference herein for all purposes.

A JavaScript library can be provided to parse the template and attach the corresponding editing tools to each component or region. The tools themselves can be rendered and positioned using World Wide Web Consortium (W3C) standards such as CSS and JavaScript. Because the tools are rendered in the browser environment, they can be easily enabled or disabled without needing a full page refresh.

According to one embodiment, editing tools can include a set of editing tools to allow editing of the overall page or template. Additionally, editing tools applicable to individual components can be displayed near the associated region or component. Editable components or regions can be demarcated. For example, editable regions can be outlined with a dashed line or other indicator. According to one embodiment, various editing tools are overlaid on the web page so that they do not distort a production view of the web page.

The architecture of FIG. 1A is provided by way of example and a template building system 100 can be implemented using a variety of architectures. Browser 104 may be implemented through execution of a web browser application and template developer through execution of a browser plug in, web extension, standalone application or execution of other instructions. Template builder 114, web content management system 112 and page generator 116 are shown as separate modules, they may be implemented through execution of the same program, execution of separate programs or according to any suitable programming architecture. Template builder 114, web content management system 112 and page generator 116 may be distributed.

As discussed above, in one embodiment, web content management system 112 may utilize a format in which a page is decomposed into a template 182, components 186 and regions 188. Template 182, regions 188 and components 186 may be managed as a set of objects comprising files (or other data structure) and associated metadata used by the web content management system. FIG. 1B is a diagrammatic representation of one embodiment of a set of objects for storing and managing templates, components and regions. Template 182, according to one embodiment, may be managed as a template object 183 comprising a template file 200 and associated metadata 201, a region 188 may be managed as a region object 189 having a region file 202 and associated metadata 203 and a component 186 may be managed as a component object 187 comprising a component file 204 and associated metadata 205.

A template object 183 can reference region objects 189 or component objects 187. According to one embodiment, for example, template file 200 may include a portion of the page source from a web page of interest (e.g., a portion of page source 150 of FIG. 1A) modified to reference the region objects 189 for "Region 1" and "Region 2". A region object 189 may reference component objects. For example, region file 202 for "Region 1" may include a include a portion of the page source from a web page of interest (e.g., a portion of page source 150 of FIG. 1A) modified to reference the component objects 187 for "Component 1" and "Component 2" and region file 202 for "Region 2" may include page source modified to reference component object 187 for "Component 3". A component file 204 may include the content that will be displayed in the portion of a web page corresponding to the component or may reference other objects. For example, the component file 204 for "Component 1" may reference a content item object 206 containing the content item 207 (in this example, a chart) that is displayed in the portion of a page corresponding to "Component 1".

Figure 2:
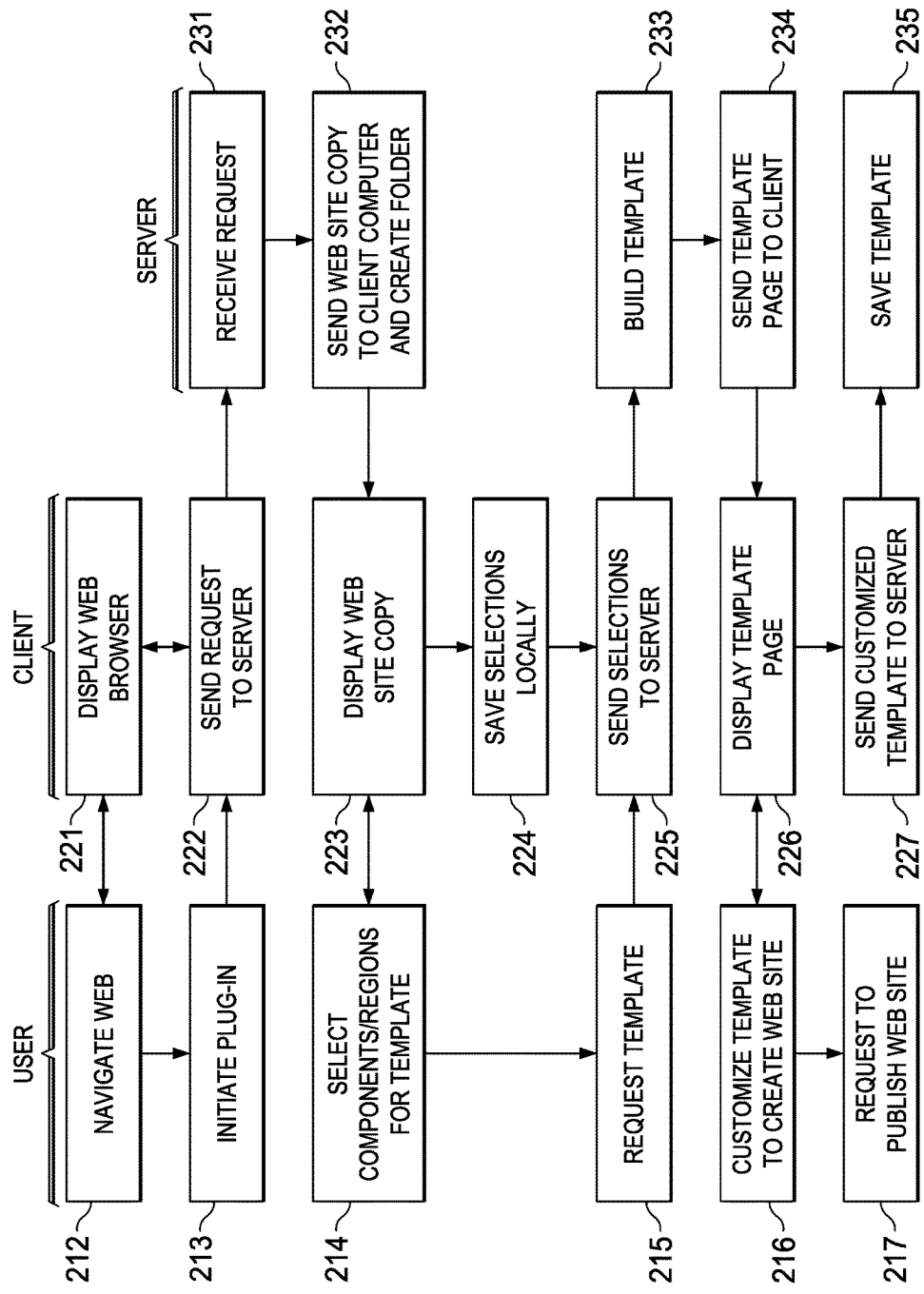
FIG. 2 depicts a flow diagram of functionality associated with generating a template based on a web page.

FIG. 2 depicts a flow diagram of functionality associated with generating a template based on a web page. According to one embodiment, various steps may be carried out by the user, a client and a server.

Navigating the web (step 212), initiating a plug-in (step 213), selecting components/regions for a template (step 214), requesting a template (step 215), customizing a template (step 216), and requesting to publish the web page (step 217) illustrate steps that are performed by a user in one embodiment.

Receiving instructions to navigate the web and displaying web pages in a web browser (step 221), receiving a request to initiate a plug-in and sending the request to a server (step 222), receiving a copy of a web page from a server and displaying the web page copy (step 223), saving components/regions selections by a user (step 224), receiving a request to create a template and sending the request to a server along with components/regions selections (step 225), receiving a template page from a server and displaying the template page for a user (step 226), and sending a customized page to the server (step 227) illustrate steps that may be performed by a client computer (e.g., executing a browser application) in one embodiment.

Receiving a request for a plug-in (step 231), sending a copy of web page source and the plug-in to the user and creating a folder (step 232), receiving a request to create a template along with components/regions selections by the user (step 233), sending a template page to a client computer (step 234) along with hosting the template, and receiving and saving a customized template page (step 235) illustrate a set of steps that may be performed by a server computer in one embodiment.

A user can navigate a web site using a web browser (step 212). The web browser can display requested web pages to the user (step 221). When the user finds a page to use as a template, the user may initiate a plug-in (or other template developer instructions) (step 213) in a web browser and the web browser may send a request a server (step 222). The server may receive the request (step 231) and send a copy of the web page source and the plug-in to the browser (step 232) for display to and use by the user (step 223). In other embodiments, the client computer may use web page source received from the web site source server and may already include the plug-in or other template developer.

The user can interact with a web browser to select portions of the web page as components or regions (step 214). The web browser may receive the component and region selections and save the selections locally or otherwise (step 224). According to one embodiment, the selections and related attributes identifying portions of the source code as components or regions are sent to the server (step 225) when the user requests creation of a template (step 215). The server can build the template (step 233) using page source and the selections of the user. This can include creating templates, components and regions as discussed above.

The server can send page source generated from the template to the user (step 234) and the web browser can display the template page (step 226). Through interaction with the template page, the user can customize the template page and create new web pages from the template page or new templates (step 216). The user may also request to save the updated template or web pages associated with the template (step 217). The web browser can send the request to the server along with updates to the template or web page associated with the template (step 227), which can be stored by the server (step 235).

The steps of FIG. 2 may be repeated as needed or desired, additional steps added, steps omitted and steps performed in different orders. Furthermore, the steps may be otherwise distributed.

Figure 3A:
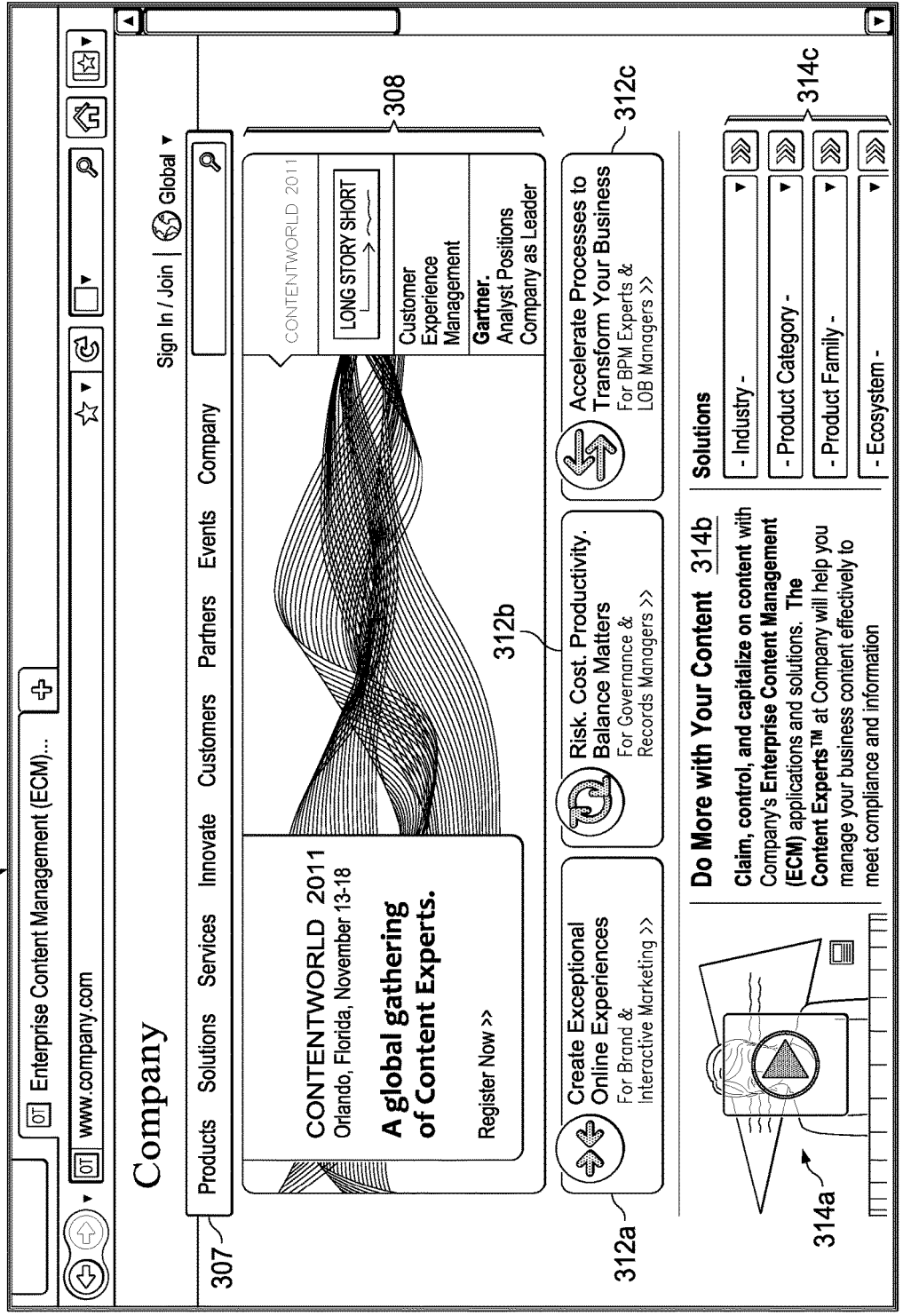
FIG. 3A depicts a web page of interest displayed in a user interface.

According to one embodiment, an end user can start the process of defining a template by navigating a browser to a web page of interest. FIG. 3A depicts a web page of interest (web page 300) displayed in a user interface provided by a user computer (e.g., client computing device 102 of FIG. 1A). Web page 300 may include a header, footer, body, etc. Various portions of the web page such as navigation bar 307, menus 308 or 314c, text 312a-312c or 314b, images, videos, media 314a, dynamic content items (e.g., third party ads that scroll or are otherwise dynamic or other dynamic content), links, jpegs, and the like may be contained in structural elements of the web page as defined by the web page source code (e.g., <div>, <table>, <iframe> and other elements).

Figure 3B:
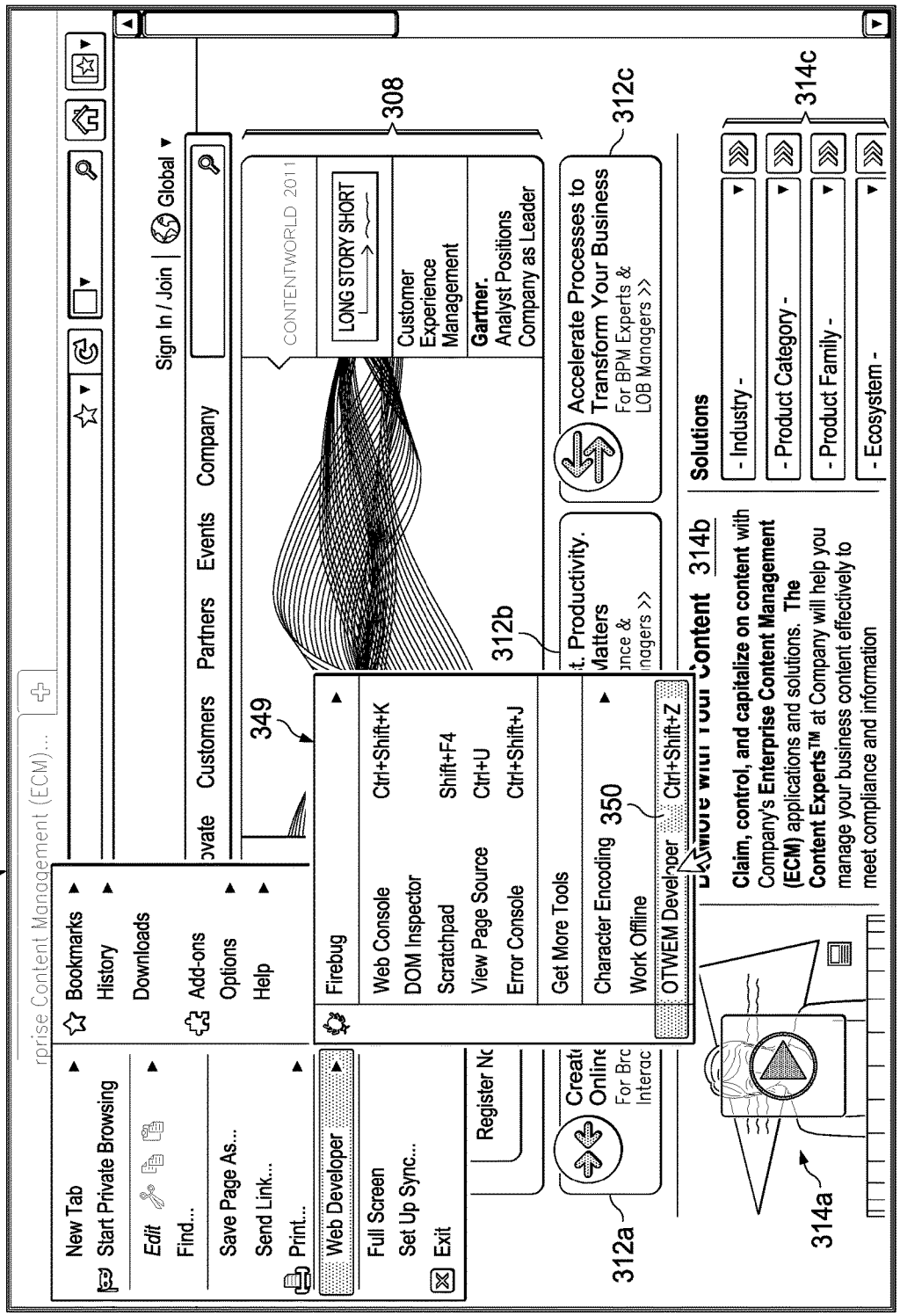
FIG. 3B depicts an embodiment of the user interface providing a menu in which a user can select a template developer.

The user may install or activate a plugin or browser extension which allows the user to identify and select elements of the web page for management by a web content management system. The plugin or browser extension may be executable to provide a template developer which in some embodiments may be the same or similar to template developer 106 as described in FIG. 1A, above. FIG. 3B depicts an embodiment of the user interface providing a drop down menu 349 in which the user can select a template developer plug-in as indicated by selection 350 (referred to as "OTWEM Developer"). When the plugin opens, a local copy of the HTML or other source code for the web page displayed may be stored locally. Also when the plugin starts, a temporary file may be created on the server (e.g., server 110) to contain information used to build templates.

Figure 4A:
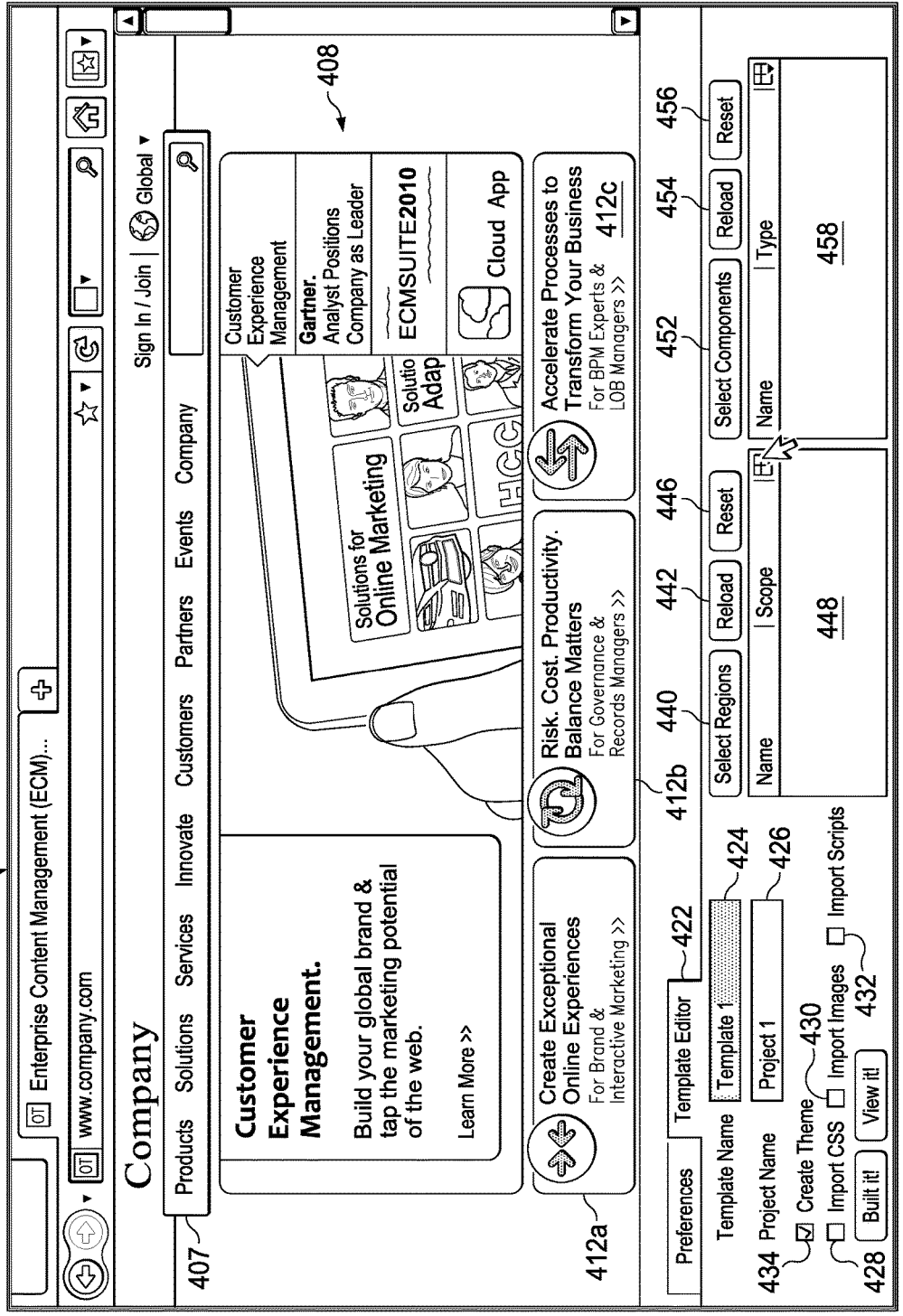
FIG. 4A depicts a screen shot of one embodiment of a user interface displaying web page rendered from the copy of the source code.

FIG. 4A depicts a screen shot of a user interface displaying the web page 400 rendered from the copy of the source code. Thus, web page 400 can be essentially identical to web page 300 and may include a header, footer, body, etc., navigation bar 407, menus 408, text 412a-412c, images, videos, media, dynamic content items (e.g., third party ads that scroll or are otherwise dynamic or other dynamic content), links, jpegs, and the like. The various portions of web page 400 may be contained in structural elements of the web page as defined by the web page source code (e.g., <div>, <table>, <iframe> and other elements).

In FIG. 4A, the user has selected the template editor tab 422 which enables selected functionality of the plugin. Under the template editor tab 422, the user is able to enter a template name 424 and a project name 426. In some embodiments, a default template name 424 or project name 426 may be provided by the plugin. The user is able to select options for creating the template. For example, the user may opt to import various external resources that will be referenced by the template including Cascading Style Sheets ("CSS") by selecting option 428, images by selecting option 430, or scripts by selecting option 432. The user may also be given the option of creating a theme by selecting option 434 to cause the server to create a theme object referencing the imported style sheets. Other options may be possible for importing CSS, images, scripts, or other elements associated with a web page.

To assist in developing a template, embodiments may provide features for organizing and displaying regions and components. The plugin may provide buttons 440, 442, 446 for allowing a user to select and control elements selected as regions and pane 448 to display a list of selected regions. The plugin may also provide buttons 452, 454 and 456 for allowing a user to select and control elements selected as components and pane 458 to display a list of components. Selection and control of regions or components may be accomplished either individually or collectively.

When the plugin is installed and the user is working under template editor tab 422, the user is able to choose "Select Components" button 452. Select Components button 452 corresponds to instructions that allow the user to visually identify areas of the page that the user would like to include as a component and Select Regions button 440 can allow the user to visually identify areas of the page that the user would like to select as a region.

Determining which part of the source code corresponds to a component candidate or region candidate may be accomplished by finding one or more <div> tags that define a division or section in the source code. Embodiments may identify component or region candidates to a user based on the pointer position. The plugin may monitor the position of the cursor or other pointer in the web page and identify the portions of the web page corresponding to the nearest <div> tags as possible component or region candidates. There may be more than one <div> tag that can correspond to a pointer position. The user may move the pointer to indicate a component or region, and may move the cursor around to switch between <div> tags to allow a user to accurately select a portion of the page as a component or region. In other embodiments, <table> or other tags may be used for finding a division or section of the source code that corresponds to the pointer location.

Indicating a portion of the web page as component candidate or region candidate may involve highlighting the corresponding area in web page 400, or may involve displaying half tones, shading, color changes, or any other visual that allows the user to visually confirm the portion of the web page is the desired region or component. The user may select a highlighted or otherwise indicated area by clicking on the area. The user may be given the option to specify attributes of the component or region. Once the user selects a portion of the web page to be a component or region, the component list in pane 448 or region pane 458 may be populated.

Clicking on Reload button 442 can cause the plug-in to refresh the portions of the web page corresponding to regions selected in pane 448 and clicking on Reload button 454 can cause the plug-in to reload the portions of the web page corresponding to components selected in pane 458. Clicking reset button 446 can remove region definitions and clicking reset button 456 can remove component definitions.

Figure 4B:
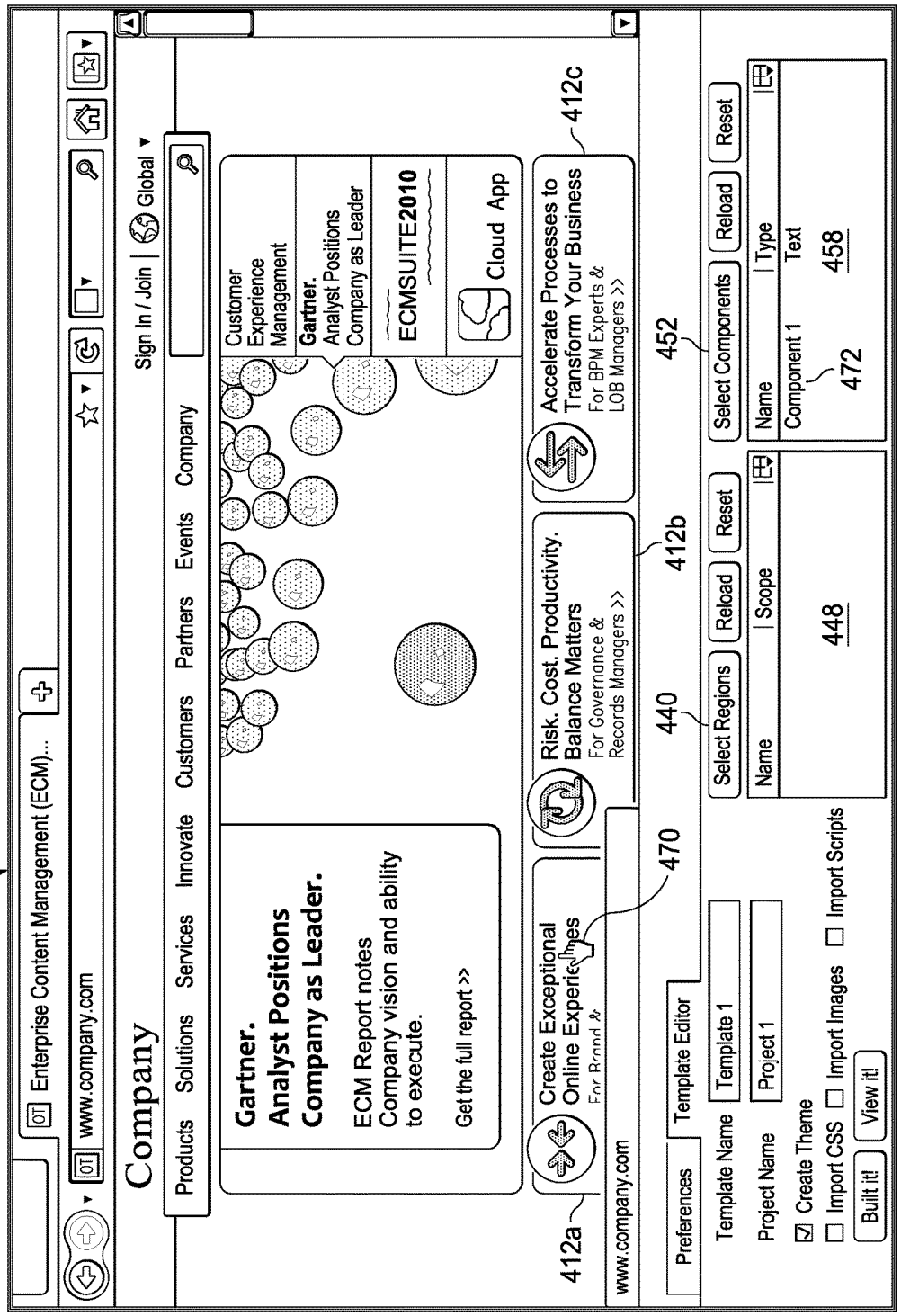
FIG. 4B depicts a screen shot of one embodiment of selecting a portion of a web page.

FIG. 4B depicts a screen shot in which a cursor 470 is positioned over text 412a of web page 400. Portion 412a may be contained in a <div> element. Consequently, if the user selects Select Component Button 452 and mouses over text 470, the plug-in can highlight the portion of web page 400 corresponding to the <div> element containing text 412a as a component candidate (or region candidate if Select Region Button 440 was selected). The user can select portion 412a as a component causing the portion of the HTML corresponding to the <div> element to be tagged as Component 1 and Component 1 entry 472 to appear in pane 458.

Figure 4C:
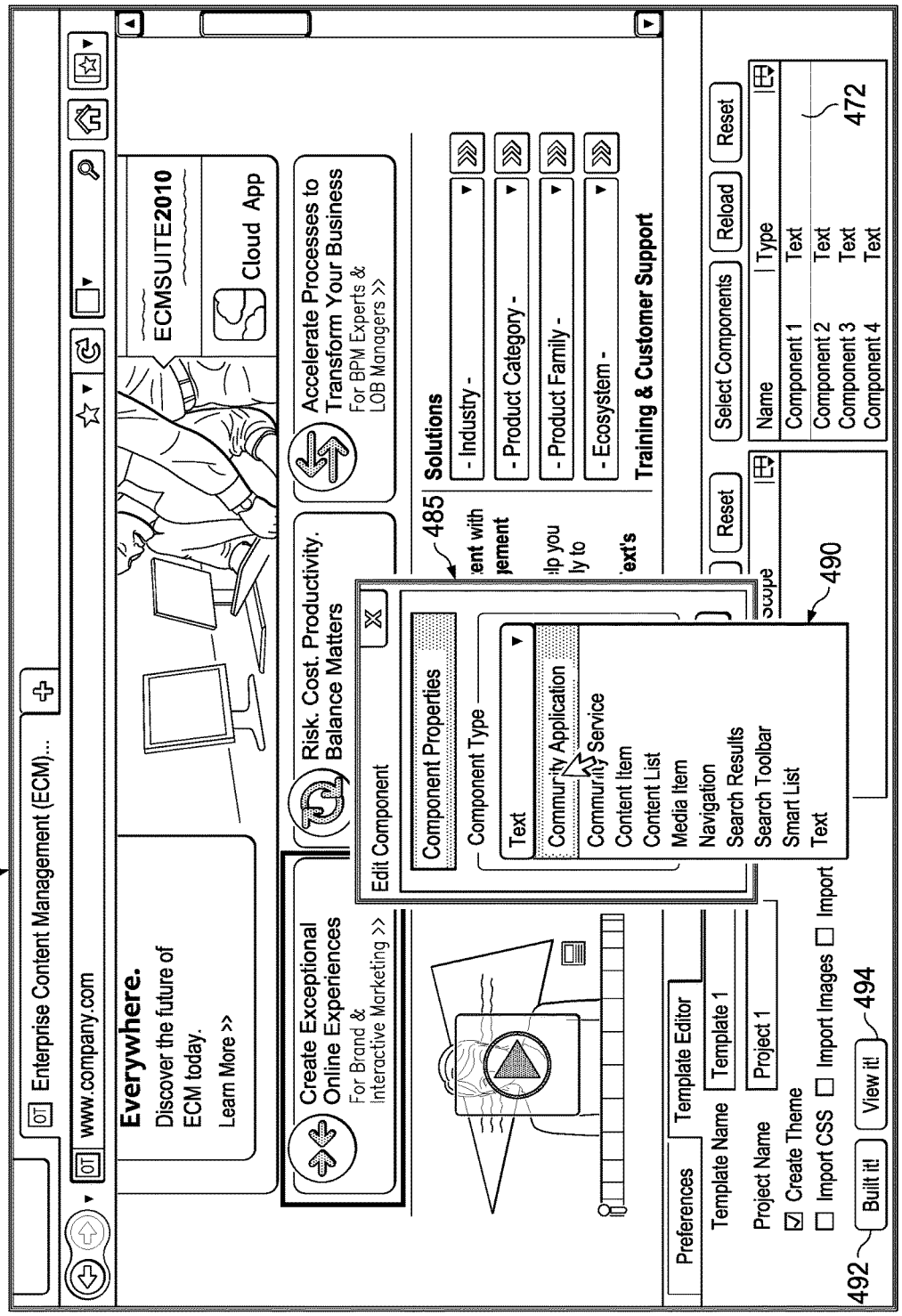
FIG. 4C depicts one embodiment of modifying a component.

Once a component has been populated inside pane 458, the user can rename the component (e.g., Internal Navigation Bar, External Links, etc.), or the plugin may assign a default name to the component (e.g., Component 1, Component 2, etc.). The user may select a component and edit properties to identify the type of component, the name, etc. FIG. 4C depicts a screen shot illustrating one embodiment of modifying a component. In this example, the user has selected Component 1 entry 472 causing an Edit Component interface 485 to be presented. The Edit Component interface 485 can allow a user to select attributes of the component including, for example, the component name and component type (e.g., in component type menu 490). The component types may be component types supported by a content management system (e.g., component types supported by a web content management system 112 of FIG. 1A). "Component 1" can be renamed and assigned a new component type or other attributes. A user can also select and edit various regions using a similar approach. The user can be presented a Region Edit interface that allows the user to specify attributes for regions.

When the user selects a component or region, the plugin associates the corresponding source code with the component or region, including modifying the copy of the source code or a page document object. One or more attributes may be added to the source code or document object to describe the area as a component or region that can be managed. The attributes may correspond to attributes used in managing templates, region or components by the web content management system. The attributes, for example, can define a name (e.g., Component 1), a type (e.g., "text"), a unique ID, or other information.

The user may select a "Build It" button 492 to instruct a server to build the appropriate template(s). When the user requests that the template be built, the user's computing device communicates with the server to send data to the server (which in some embodiments includes template builder 114 described in FIG. 1A). Data sent to the server computer may include the attributes or other code that enables the server to transform the HTML into a template and manageable components and regions. The data may identify areas as regions or components, and define portions or areas that are to be used for text, navigation, etc. In some cases, the data may include the source code stored in the local cache.

Generating a template may include converting the data into a form that allows management of both the content and structure. This can include creating template, component, region and other content objects and the appropriate files or other data structures (e.g., JSP files) for the template, components and regions based on the data provided by the client computing device.

Figure 5A:
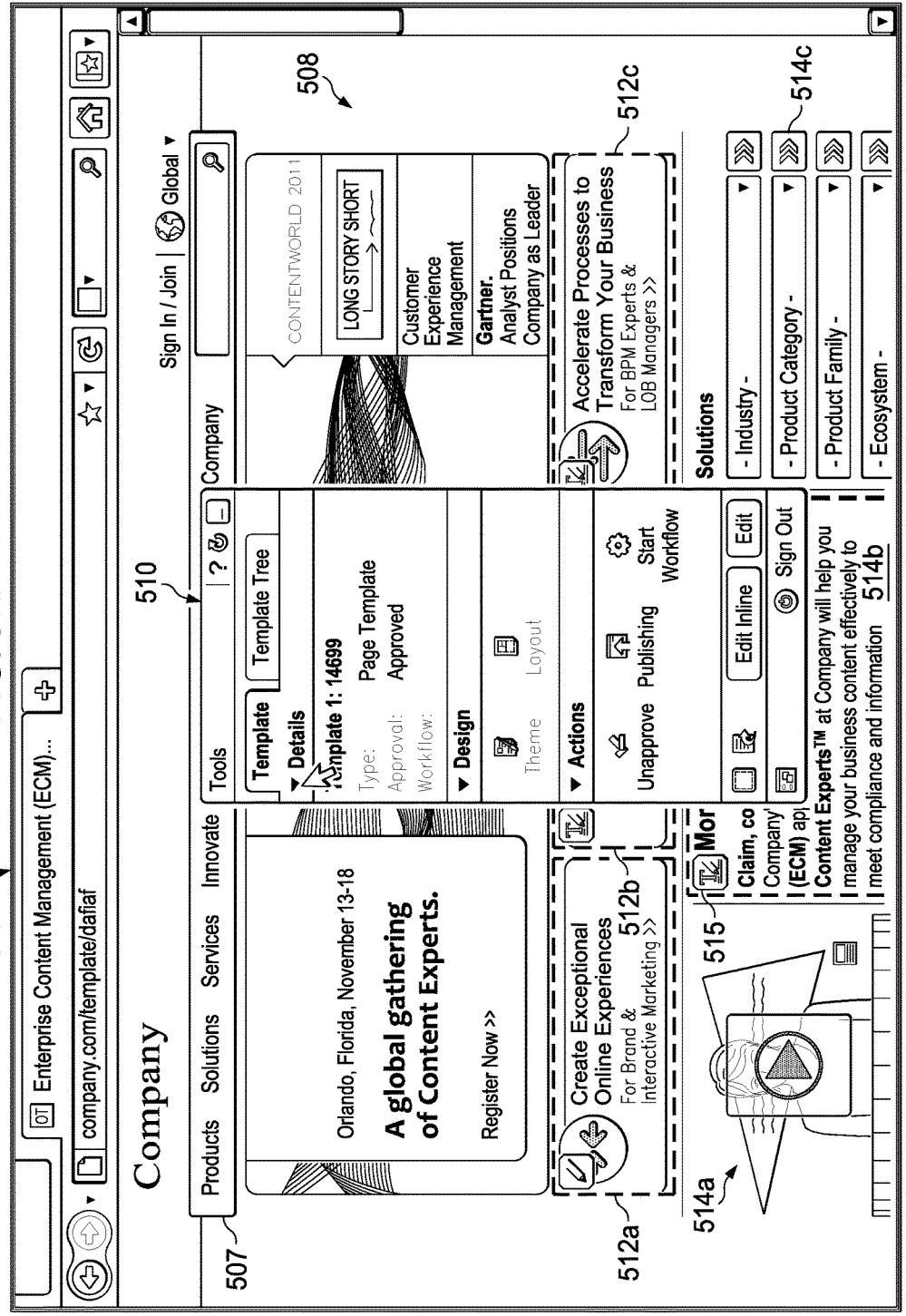
FIG. 5A depicts one embodiment of an interface displaying a web page returned by a server computer based on a template.

When the user selects "View It" button 494, the plugin requests a page corresponding to the template from the server. FIG. 5A depicts an interface displaying web page 500 returned by a server computer based on a template. At first glance, rendered web page 500 resembles the web page 300 rendered in FIG. 3A and web page 400 rendered in FIG. 4A and includes a header, footer, body, etc., having features such as navigation bar 507, menus 508 or 514c, text 512a-512c or 514b, images, videos, media 514a, dynamic content items, links, jpegs, and the like. However, the web page 500 can be hosted by a content management system (e.g., server 110 of FIG. 1A) instead of the original web site server computer and the page source for web page 500 may rendered by processing the templates, regions and components managed by the web content management system.

If web page 500 is accessed in a content management environment (e.g., by a web site developer or other user), the user may be given the option to edit the template, component or regions. A window, menu, box, tool box and the like may be presented in conjunction with the page. For example, window 510 provides information regarding the underlying template, such as the template name and unique ID, status in the content management system and other information. Window 510 also allows the user to initiate actions on the template object in the content management system, such as initiating workflow actions. Furthermore, tools may be accessed to edit components or regions. For example, tools icon 515 may provide access to tools for editing text 514b.

Figure 5B:
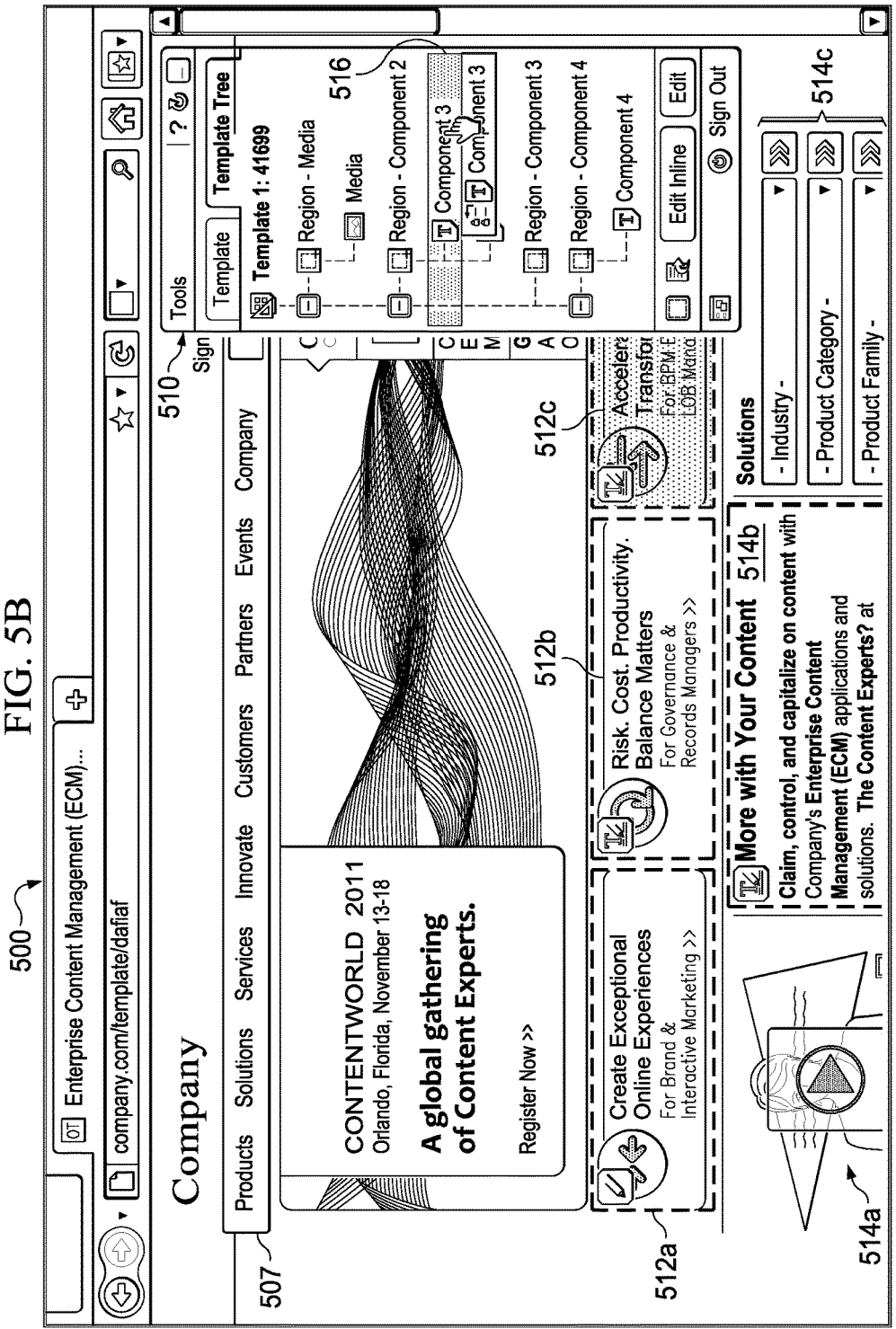
FIG. 5B depicts one embodiment of an interface displaying a template hierarchy.

FIG. 5B depicts the interface displaying web page 500 with a "template tree" tab selected in window 510. The template tree tab displays a hierarchal list of regions and components associated with web page 500. The portions of web page 500 corresponding to the regions and components may be visually indicated (e.g., by highlighting, dashed lines or otherwise). The user may select a component in the template tree tab and move the component in the hierarchy and move the component to a new region.

Figure 5C:
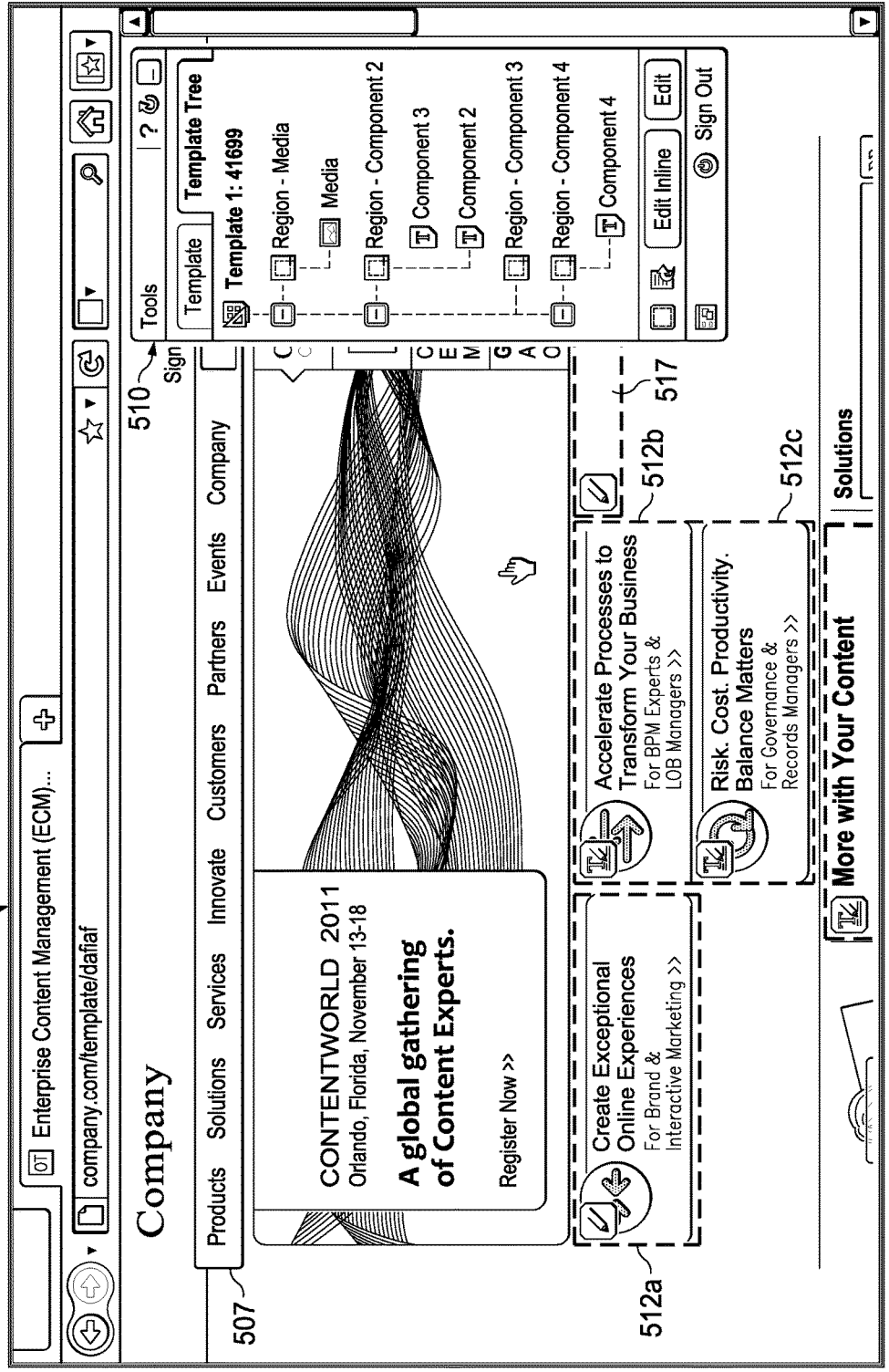
FIG. 5C depicts one embodiment of an interface displaying a web page after a component has been moved.

In FIG. 5B, for example, the user can select "Component 3", corresponding to text 512c, in window 510 and move Component 3 from "Region-Component 3 to "Region-Component 2" as indicated at selection 516. FIG. 5C illustrates web page 500 after the move is complete, showing that text 512c has moved, leaving portion 517 of web page 500 corresponding to "Region-Component 3" empty.

Figure 5D:
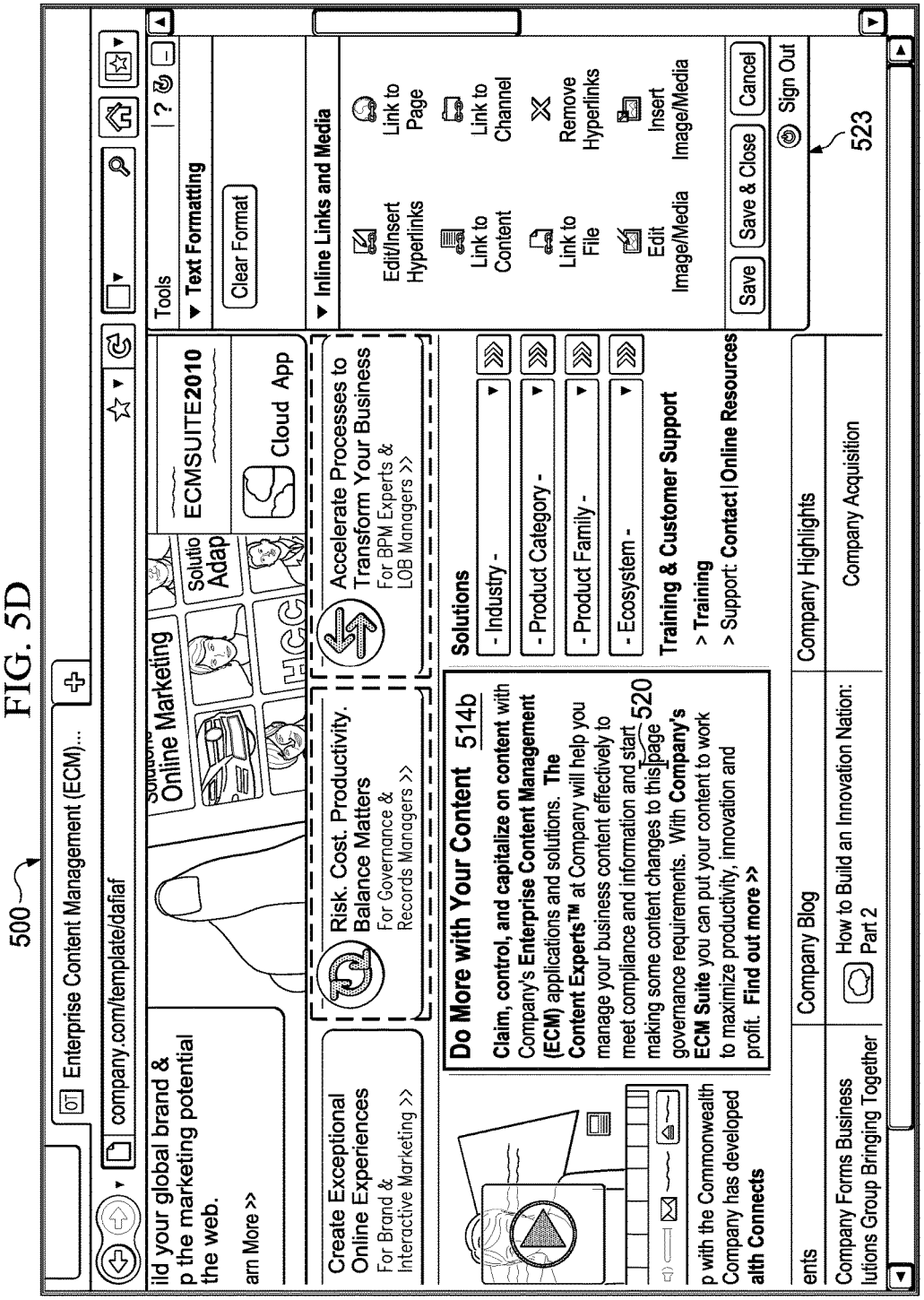
FIG. 5D depicts one embodiment of an interface in which a component is being edited.

As discussed above, a web page may include editing tools to allow a user to edit the components or regions to create a new template or web page based on the template. FIG. 5D, for example, illustrates on embodiment of editing tools provided in response to the user selecting tools icon 515 of FIG. 5A to edit text component 514b. As depicted in FIG. 5D, component 514b contains text which may be edited simply by positioning a cursor 520 in the text area such that the user can start making some content changes to the page. Instructions associated with window 523 allow a user to clear formatting within page component, edit/insert or remove hyperlinks, link to pages, link to content, link to a channel, link to a file, insert or edit images/media, etc.

Figure 5E:
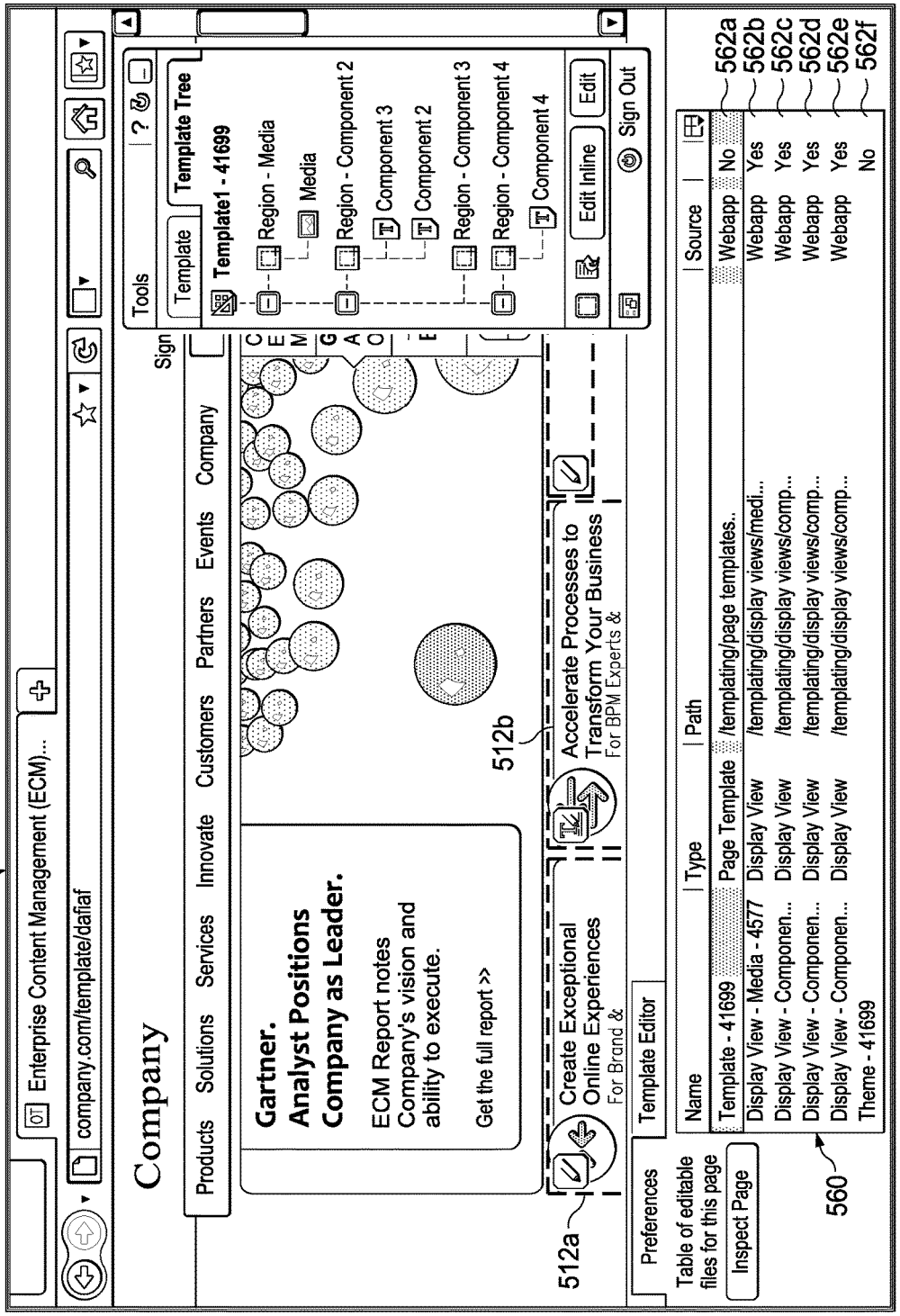
FIG. 5E depicts one embodiment of an interface displaying objects and files associated with a template.

The user may also inspect a template to see all the technical objects associated with the template. For example, .jsp or css objects that are used for generating page 500 may be viewed. FIG. 5E depicts a screen shot of page 500 with window 560 displaying six different objects 562a-f that a user has selected. In FIG. 5E, these six objects 562a-562f refer to the page template, components such as 512a and 512b, as well as 512c and 514b (see FIG. 5A), and theme 562f. More objects are possible.

Each object 562a-f can be accessed to edit the source code, view the source code, edit the object, copy the ID, path or name or take other action. For example, a user may double-click to select one of objects 562a-f. Based on the selection of a given object, the user may be provided a menu of options for accessing the object. For example, the user may be provided an option that allows a user to edit source, the object or other information.

Appropriate windows and interfaces can be displayed to allow editing. For example, if the user selects to edit the source for an object, a window can be displayed including source code contained in the source code file for the object. Thus, if the user selects to edit the source of the "Template 1" object, a window is displayed through which the user may access the source code in the Template 1 file and add, delete or otherwise modify the source code as a way of customizing the template. Modifications to the template, regions or components may be saved as a new template or page to the web content management system.

Figure 6:
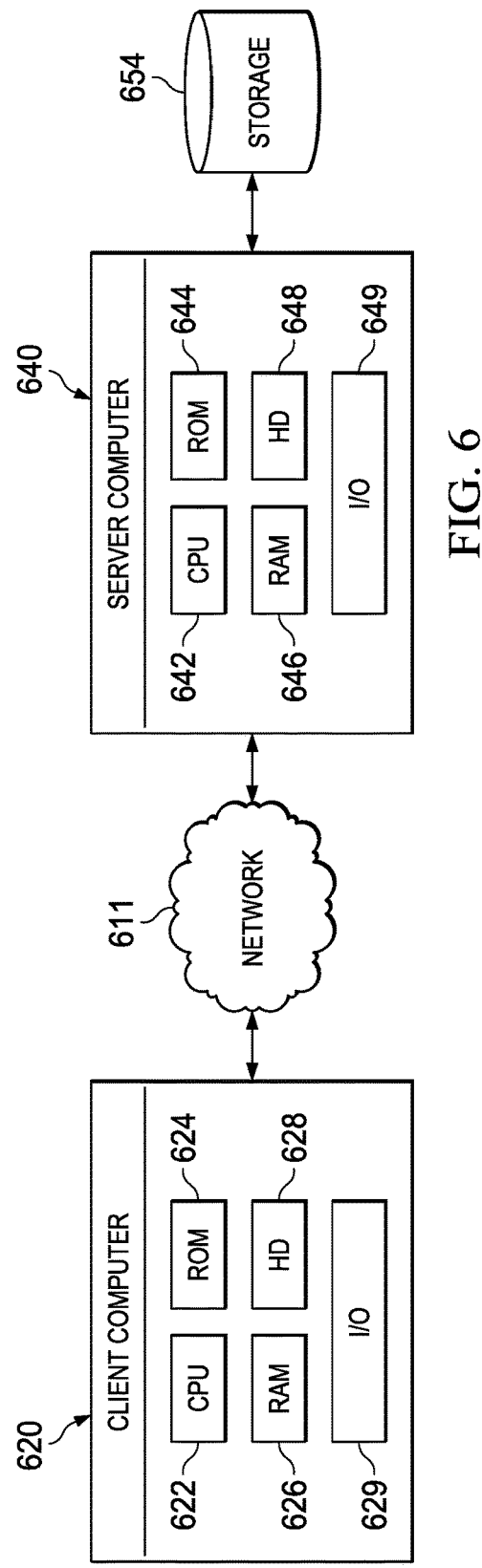
FIG. 6 is a diagrammatic representation of one embodiment of a computer architecture.

FIG. 6 illustrates an exemplary architecture for a template building system. The architecture includes external network 611 that can be bi-directionally coupled to client computer 620 and web content management server 640. Server 640 can be bi-directionally coupled to storage 654. Server 640 and storage 654 may be part of a network site.

Client computer 620 may provide a browser and template developer and server 640 may provide a template builder. Within server 640, a plurality of computers (not shown) may be interconnected to each other over an internal network or a combination of internal and external networks. For simplification, a single system is shown for server 640. Other systems (e.g., page generator, application server, etc.) may be part of server 640 or additional systems that are bi-directionally coupled to an internal network.

A plurality of other client computers 620 may be bi-directionally coupled to network 611. Client computer 620 can include central processing unit ("CPU") 622, read-only memory ("ROM") 624, random access memory ("RAM") 626, hard drive ("HD") or storage memory 628, and input/output device(s) ("I/O") 629. I/O 629 can include a keyboard, monitor, printer, electronic pointing device (e.g., mouse, trackball, etc.), or the like. Client computer 620 can include a desktop computer, a laptop computer, or some other computing device capable of communicating over a network. Server 640 can include a server computer comprising CPU 642, ROM 644, RAM 646, HD 648, and I/O 649. Server 640 can be configured to communicate with client computer 620 over network 611. Each of the computers 620 and 640 in FIG. 6 may have more than one CPU, ROM, RAM, HD, I/O, or other hardware components. For simplicity, each computer is illustrated as having one of each of the hardware components, even if more than one is used.

Each of computers 620 and 640 is an example of a data processing system. ROM 624 and 644; RAM 626 and 646; HD 628 and 648; and memory 654 can include media that can be read by CPU 622 or 642. Therefore, each of these types of memories includes a data processing system readable medium. These memories may be internal or external to client computers 620 or server 640.

Portions of the methods described herein may be implemented in suitable software code that may reside within ROM 624 or 644, RAM 626 or 646, or HD 628 or 648. In addition to those types of memories, the instructions in an embodiment may be contained on a data storage device with a different data processing system readable storage medium, such as a hard disk. A combination of software code elements may be embodied within a data processing system readable medium on client computer 620 or server computer 640. Alternatively, the instructions may be stored as software code elements on a DASD array, magnetic tape, floppy diskette, optical storage device, or other appropriate data processing system readable medium or storage device.

In an illustrative embodiment, the computer-executable instructions may be lines of compiled C$^{++}$, Java, or other language code. Other architectures may be used. For example, the functions of any one of the computers may be performed by a different computer shown in FIG. 6. Additionally, a computer program or its software components with such code may be embodied in more than one data processing system readable medium in more than one computer.

In the hardware configuration above, the various software components may reside on a single server computer or on any combination of separate server computers. In alternative embodiments, some or all of the software components may reside on the same server computer.

Communications between any of the computers in FIG. 6 can be accomplished using electronic, optical, radio-frequency, or other signals. When a user is at client computer 620, client computer 620 may convert the signals to a human understandable form when sending a communication to the user and may convert input from a human to appropriate electronic, optical, radio-frequency, or other signals to be used by client computer 620 or server computer 640. Similarly, when an operator is at server computer 640, server computer 640 may convert the signals to a human understandable form when sending a communication to the operator and may convert input from a human to appropriate electronic, optical, radio-frequency, or other signals to be used by client computers 620 or server computer 640.

Embodiments described herein make it possible to create in a few seconds a result that would otherwise take days if not weeks, by making it possible to build templates from any existing web page, and by relying on a visual identification process. Advantageously, manageable web content can be rapidly and automatically created without having to manually breakdown or decompose HTML mock-ups or pages into discrete elements. The invention therefore also makes it possible for people with little or no programming skills to create manageable web content and manage a template independently.

The detailed description and the specific examples described above, while indicating the preferred embodiments, are given by way of illustration only and not by way of limitation. Descriptions of known materials and manufacturing techniques may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It is also within the spirit and scope of the invention to implement through software programming, operations, methods, routines or portions thereof described herein, where such software programming or code is stored in a computer-readable medium and can be operated on by a processor to permit a computer to perform any of the steps, operations, methods, routines or portions thereof described herein. Embodiments may be implemented in one or more digital computers executing programming instructions, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means. Based on the disclosure and teachings provided herein, a person of ordinary skill in the art will appreciate other ways and/or methods to implement the invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Although systems and methods have been described with respect to specific embodiments thereof, these embodiments are merely illustrative, and not restrictive. The description herein of illustrated embodiments of the invention, including the description in the Abstract and Summary, is not intended to be exhaustive or to limit the systems and methods to the precise forms disclosed herein and the inclusion of any particular embodiment, feature or function within the description, including the Abstract or Summary, is not intended to limit the scope of the systems and methods to such embodiment, feature or function). Rather, the description is intended to describe illustrative embodiments, features and functions in order to provide a person of ordinary skill in the art context to understand the disclosure without limiting the systems and methods to any particularly described embodiment, feature or function, including any such embodiment feature or function described in the Abstract or Summary. While specific embodiments of, and examples for, are described herein for illustrative purposes only, various equivalent modifications are possible within the spirit and scope of the invention, as those skilled in the relevant art will recognize and appreciate. As indicated, these modifications may be made in light of the foregoing description of illustrated embodiments and are to be included within the spirit and scope of the invention. Thus, while the systems and methods have been described herein with reference to particular embodiments thereof, a latitude of modification, various changes and substitutions are intended in the foregoing disclosures, and it will be appreciated that in some instances some features of embodiments will be employed without a corresponding use of other features without departing from the scope and spirit of the invention as set forth. Therefore, many modifications may be made.

What is claimed is:

1. A system for building and editing templates from existing web pages or web sites comprising:
    a computer comprising a template builder configured to:
    receive template data, wherein the template data includes web page source code corresponding to a first component or region and a second component or region selected by a user from a rendering of an existing web page;
    generate a third component or region corresponding to the first selected component or region, wherein the third component or region is different from the first selected component or region and comprises a first portion of the web page source code from the template data;
    generate a fourth component or region corresponding to the second selected component or region, wherein the fourth component or region is different from the second selected component or region and comprises a second portion of the web page source code from the template data;
    generate a template comprising the third component or region and the fourth component or region, wherein the template is capable of being retrieved and used to generate multiple different web pages, and wherein generating the template comprises modifying the second portion of the web page source code to reference the first region or component; and
    store the template in a data store.

2. The system of claim 1, wherein the template builder imports external resources referenced in the web page source code.

3. The system of claim 1, wherein the template builder creates content objects for the template, third component or region, and fourth component or region, in a web content management system.

4. The system of claim 1, further comprising: a template builder to:
    enable a user to visually identify and select one or more components or regions in the rendering of the web page;
    receive a first selection of the first selected component or region of the web page;
    receive a second selection of the second selected component or region of the web page;
    store as the template data web page source code corresponding to the first selected component or region and the second selected component or region in a memory of the computer; and
    provide the template data to a template builder.

5. The system of claim 4, wherein the template developer:
    receives a plurality of region or component selections indicating a plurality of selected portions of the web page;

stores the plurality of region or component selections; and for each of the plurality of selected portions of the web page the template builder generates a region or component comprising a portion of the web page source code corresponding to that selected portion of the web page.

6. The system of claim 4, wherein the template developer parses web page source code to identify elements of web page source code and visually identify portions of the web page corresponding to the identified elements as the one or more portions of the web page.

7. A method for creating templates comprising:

receiving template data, wherein the template data includes web page source code corresponding to a first component or region and a second component or region selected by a user from a rendering of an existing web page;

generating a third component or region corresponding to the first selected component or region, wherein the third component or region is different from the first selected component or region and comprises a first portion of the web page source code from the template data;

generating a fourth component or region corresponding to the second selected component or region, wherein the fourth component or region is different from the second selected component or region and comprises a second portion of the web page source code from the template data;

generating a template comprising the third component or region and the fourth component or region, wherein the template is capable of being retrieved and used to generate multiple different web pages, and wherein generating the template comprises modifying the second portion of the web page source code to reference the first region or component; and storing the template in a data store.

8. The method of claim 7, further comprising creating importing external resources referenced in the web page source code.

9. The method of claim 7, further comprising creating content objects for the template, third component or region, and fourth component or region, in a web content management system.

10. The method of claim 7, further comprising:

enabling a user to visually identify and select one or more components or regions in the rendering of the web page;

receiving a first selection of the first selected component or region of the web page;

receiving a second selection of the second selected component or region of the web page;

storing as the template data web page source code corresponding to the first selected component or region and the second selected component or region in a memory of the computer; and providing the template data to a template builder.

11. The method of claim 10, further comprising:

receiving a plurality of region or component selections indicating a plurality of selected portions of the web page;

storing the plurality of region or component selections; and for each of the plurality of selected portions of the web page, generating a region or component comprising a portion of the web page source code corresponding to that selected portion of the web page.

12. The method of claim 10, further comprising parsing web page source code to identify elements of web page source code and visually identify portions of the web page corresponding to the identified elements as the one or more portions of the web page.

13. A non-transitory computer readable medium including a set of computer instructions for:

receiving template data, wherein the template data includes web page source code corresponding to a first component or region and a second component or region selected by a user from a rendering of an existing web page;

generating a third component or region corresponding to the first selected component or region, wherein the third component or region is different from the first selected component or region and comprises a first portion of the web page source code from the template data;

generating a fourth component or region corresponding to the second selected component or region, wherein the fourth component or region is different from the second selected component or region and comprises a second portion of the web page source code from the template data;

generating a template comprising the third component or region and the fourth component or region, wherein the template is capable of being retrieved and used to generate multiple different web pages, and wherein generating the template comprises modifying the second portion of the web page source code to reference the first region or component; and storing the template in a data store.

14. The computer readable medium of claim 13, further comprising instructions for creating importing external resources referenced in the web page source code.

15. The computer readable medium of claim 13, further comprising instructions for creating content objects for the template, third component or region, and fourth component or region, in a web content management system.

16. The computer readable medium of claim 13, further comprising instructions for:

enabling a user to visually identify and select one or more components or regions in the rendering of the web page;

receiving a first selection of the first selected component or region of the web page;

receiving a second selection of the second selected component or region of the web page;

storing as the template data web page source code corresponding to the first selected component or region and the second selected component or region in a memory of the computer; and providing the template data to a template builder.

17. The computer readable medium of claim 16, further comprising instructions for:

receiving a plurality of region or component selections indicating a plurality of selected portions of the web page;

storing the plurality of region or component selections; and for each of the plurality of selected portions of the web page, generating a region or component comprising a portion of the web page source code corresponding to that selected portion of the web page.

* * * * *